United States Patent [19]
Gelzer

[11] 3,737,024
[45] June 5, 1973

[54] WORK-SUPPORTING FIXTURE FOR A CONVEYOR SYSTEM

[76] Inventor: John R. Gelzer, 4660 Kenny Road, Columbus, Ohio

[22] Filed: Nov. 24, 1971

[21] Appl. No.: 201,795

[52] U.S. Cl. ................................................198/181
[51] Int. Cl. ..............................................B65g 17/00
[58] Field of Search..........................198/1, 181, 189; 104/18, 20, 25, 172 B

[56] References Cited

UNITED STATES PATENTS 1,863,748  6/1932  Geiger......................................198/181
3,679,040  7/1972  Kretzschmar et al......................198/1

Primary Examiner—Richard E. Aegerter
Assistant Examiner—Joseph E. Valenza
Attorney—William V. Miller, Eugene J. Mahoney and Robert E. Stebens

[57] ABSTRACT

A work-supporting fixture is provided for a conveyor system having an endless conveyor formed with positive engagement elements supported for traversal of a path including arcuate portions. The work supporting fixtures each include a base frame adapted to engage and support a workpiece thereon and a pair of guide tongues adapted to interengage with the conveyor system for support and traversal of the conveyor path. The guide tongues are pivotally mounted on the base frame in spaced relationship with the pivot points or pivot axes being spaced apart a distance such that the pair of tongues will remain in proper engagement with the conveyor throughout the fixture's course of travel.

5 Claims, 10 Drawing Figures

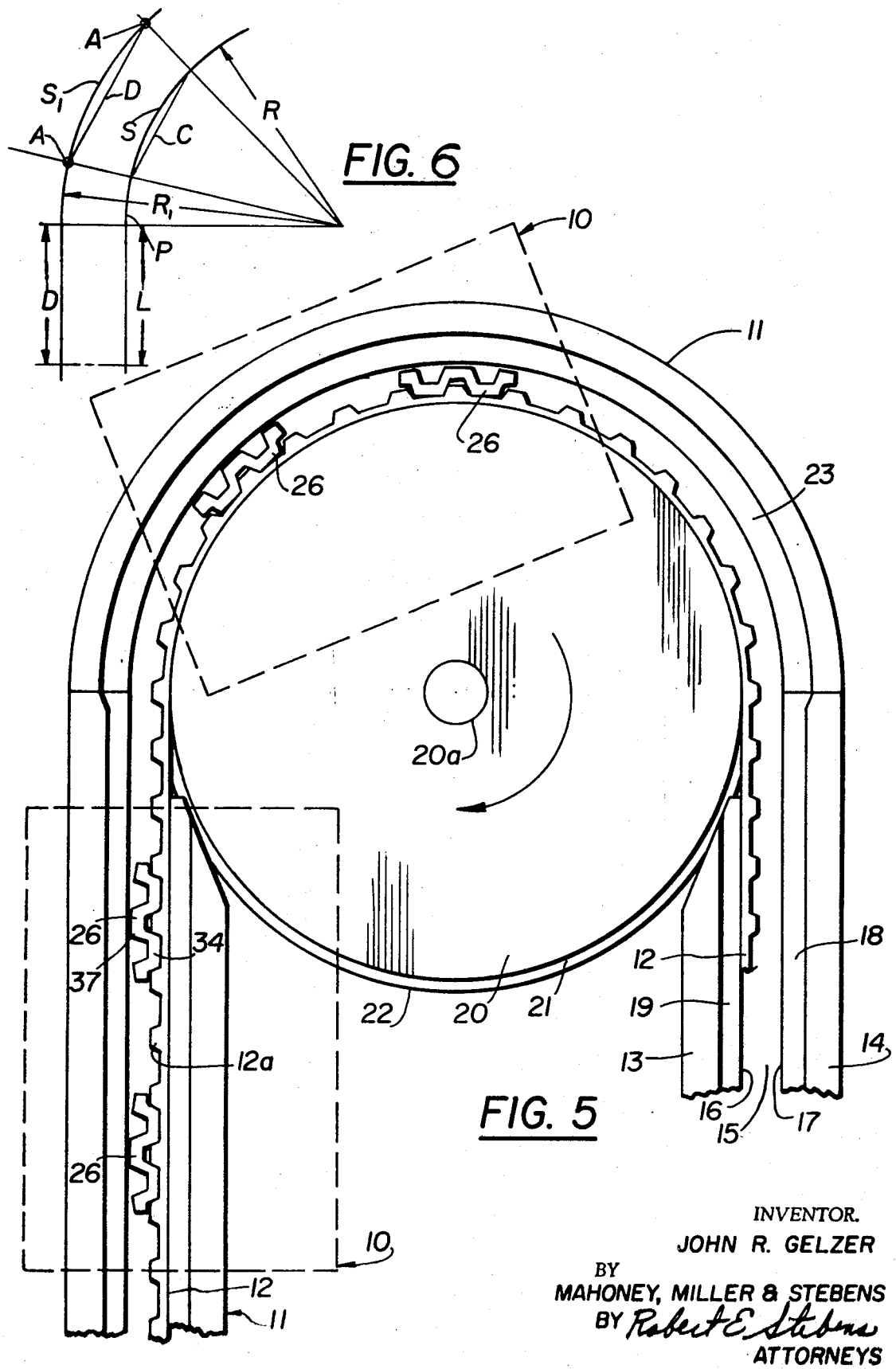

3,737,024

WORK-SUPPORTING FIXTURE FOR A CONVEYOR SYSTEM

BACKGROUND OF THE INVENTION

Work-supporting fixtures constructed in accordance with the known prior art for utilization in conveyor systems have included only one guide tongue adapted to interengage with an endless conveyor in a guideway for propulsion and support of the fixture. This construction necessitates a substantial guideway structure where the fixture is relatively large for transport of large work pieces as it is the primary function of the conveyor to provide a propulsion or driving force. Increasing the guideway structure results in a proportional increase in equipment cost.

BRIEF DESCRIPTION OF THE INVENTION

The work-supporting fixture of this invention is of a novel construction enabling utilization of more than one guide tongue thereby providing improved stability for the workpiece being transported without increasing the guide way structure as is necessary in the case of the prior art. In conveyor systems of the type adapted to incorporate this fixture, the endless conveyor and the guide tongues of the fixture are formed to provide a positive driving interengagement which comprises tooth-form elements of well known forms. The pitch or spacing of these tooth-form elements on the conveyor is a fixed distance and the utilization of fixtures having two guide tongues is complicated by the fact that the pitch remains the same as a given segment or portion of the endless conveyor traverses the guideway which has arcuately curved portions. The spacing of the two guide tongues on the fixture also remains fixed and, while this spacing would be the same as the conveyor pitch for a straight run portion, there will be interference as the fixture traverses an arcuate segment of the conveyor system. This interference results from the geometry as will be described in detail in conjunction with the accompanying drawings.

This interference problem is avoided with the fixture structure of this invention by pivotally mounting the two guide tongues at a predetermined spacing and in relationship to the radius of curvature of the arcuate segments of the guideway. In brief, this spacing is an integral multiple of the pitch of the tooth-form elements and the pivotal mounting point is at a radius greater than that of the pitch circle of the conveyor such that the chordal distance between pivot points on the pivot radius is equal to the length of the corresponding portion or segment of the pitch circle.

Utilization of the two guides tongues for a single fixture enhances the stability of a workpiece being transported thereon through reliance on a relatively more broad base. As a consequence, it is not necessary to increase the guide-way structure and results in minimal fabrication costs for a conveyor system capable of accommodating a given size work piece.

These and other objects and advantages of the fixtures of this invention will be readily apparent from the following detailed description of an embodiment thereof and the accompanying drawings.

DESCRIPTION OF THE DRAWINGS

FIG. 5 is a diagrammatic plan view of a conveyor system having two work-supporting fixtures embodying this invention incorporated therein with only the guide tongues of each fixture shown in full lines.

FIG. 6 is a geometrical diagram on an exaggerated scale to more clearly illustrate the interference.

DETAILED DESCRIPTION OF THE INVENTION

Figure 1:
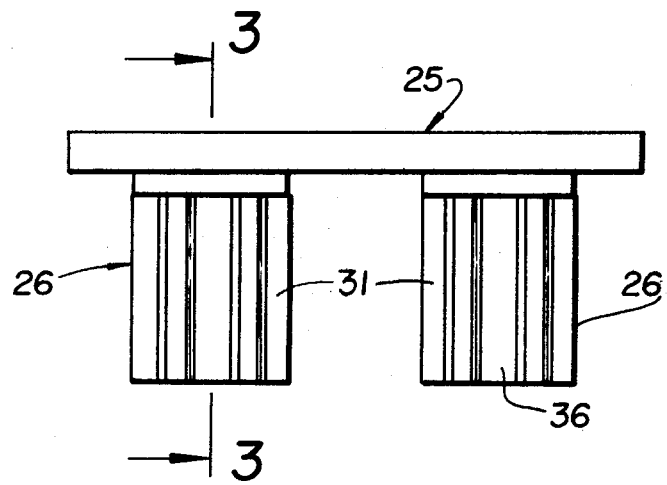
FIG. 1 is a front elevational view of a work-supporting fixture embodying this invention.
Figure 2:
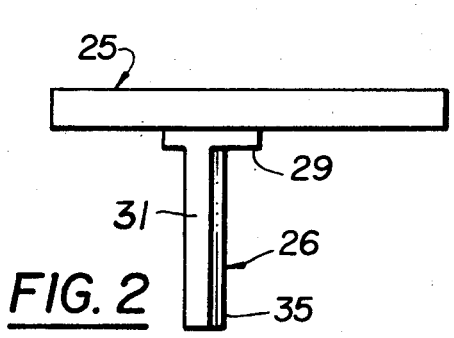
FIG. 2 is a side elevational view of the fixture.
Figure 4:
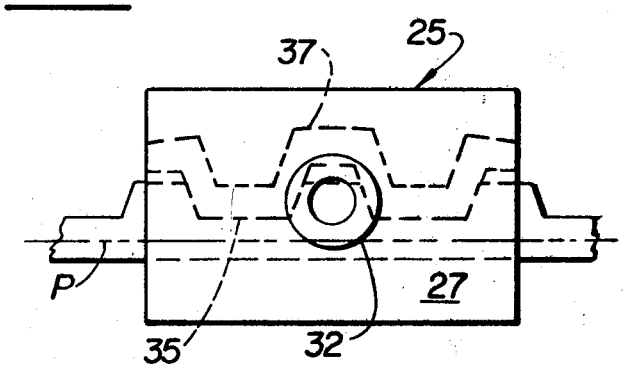
FIG. 4 is a top plan view of the guide tongue of FIG. 3 disassembled from the base frame but engaged with a conveyor.
Figure 3:
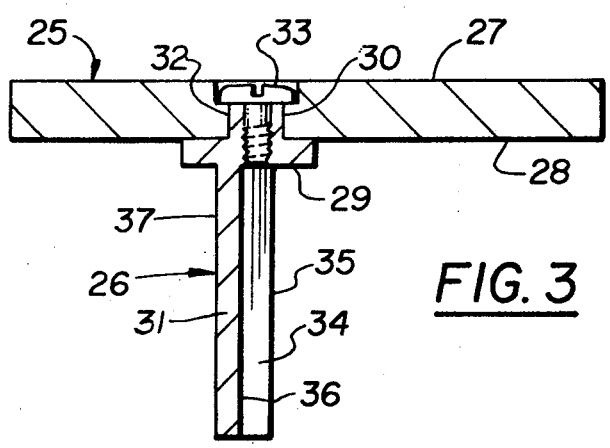
FIG. 3 is a vertical sectional view on an enlarged scale taken along line 3—3 of FIG. 1.

A work-supporting fixture 10 embodying this invention is shown in FIGS. 1–4 with a portion of a conveyor system adapted to utilize this fixture illustrated in plan view in FIG. 5. A typical conveyor system as is illustrated, comprises a guideway 11 and an endless conveyor 12 supported for traversal of the guideway. Forming the guideway are spaced guide tracks 13 and 14 relatively disposed to form a path 15 for traversal by the endless conveyor and cooperatively engageable portions of the fixtures. Each guide track includes upstanding opposed wall surfaces 16 and 17 defining the guideway path with at least the outermost guide track 14 having a top edge-surface 18 forming a vertical support for the fixtures. Guide track 13 may also advantageously be formed with a similar top-edge surface 19.

A typical conveyor system has a closed path and necessarily includes arcuately curved sections or portions for effecting a change in direction. An exemplary arcuately curved section is illustrated in FIG. 5 for effecting a directional change of 180°. It will be apparent that the change in direction at a particular point may be either greater or less as dictated by the specific circumstances of the conveyor system. For an arcuate segment, the innermost guide track 13 is interrupted and a guide pulley 20 interposed therein and supported on an axis 20a for rotation in the plane of the guideway 11. The peripheral surface 21 is tangentially disposed to the wall surface 16 of the inner guide track 13 thereby providing a substantially continuous surface around which is trained the endless conveyor 12. Preferably, an outwardly directed flange 22 is formed around this peripheral surface 21 to engage the lower edge of the endless conveyor to maintain the vertical position thereof. Completing the guideway 11 is an arcuately curved segment 23 in the outer guidetrack 14. Rotational movement of the pulley 20 is indicated by the directional arrow placed thereon with the driving means for the conveyor system not shown as it forms no part of the invention.

Cooperating with this conveyor system are one or more work-supporting fixtures 10. Two such fixtures are diagrammatically shown in FIG. 5 for illustrating the cooperative relationship. Having specific reference to FIGS. 1–4, the illustrative fixture 10 is seen to comprise a base frame 25 and a pair of guide tongues 26. The base frame 25 in this example merely comprises a flat plate of rectangular configuration which is adapted to be carried in a horizontal plane having an upper surface 27 providing a support for a workpiece (not shown) as well as associated workpiece fastening means (also not shown). The primary function of the base frame 25 in this structure for the purpose of describing this invention is a mounting for the guide tongues 26 and it will be apparent that the base frame may be otherwise configured as dictated by the specific circumstances.

Both guide tongues 26 are similarly configured and are pivotally mounted on the base-frame 25 in depending relationship to a lower surface 28 thereof for rotation about a vertical axis. Each guide tongue 26 is fabricated with a plate-form base 29 disposed in coplanar relationship to the surface 28, a stub axle 30 projecting upwardly therefrom and a main body portion 31 extending a distance downwardly from the base. Pivotal mounting of the guide tongue 26 is accomplished by journalling the stub axle 30 in a bearing aperture 32 formed in the base frame and utilizing fastening means 33 such as a cap screw threaded into the axle for securing the tongue in assembled relationship with the base frame. The bearing aperture 32 may be countersunk to recess the head of the fastening screw 33 below the upper surface 25.

In this embodiment of the guide tongue, the main body portion 31 is formed as a short section of a rack gear with two tooth-form elements 34 extending vertically as is the axis of rotation. The cross-sectional configuration of the body portion 31 is more clearly illustrated in FIG. 4 where the body portions are shown interengaged with the endless conveyor 12 that is a gear belt formed with mating tooth-form elements 12a along one vertical surface. The tooth-form elements 34 have flat crests 35 that contact the root surface on the conveyor 12 at either side of the tooth-form element 12a which interfits with a groove 36 intermediate the crests. By appropriately dimensioning the body portion 31, the vertical surface 37 thereof opposite the crests 35 will be in sliding contact with the wall surface 16 of the outer guide track 14 thereby maintaining the intermeshed tooth relationship for driving the fixture around the guideway path 15. This surface is also curved as a vertically oriented cylindrical segment to assure adequate clearance as the guide tongue traverses the curved portion of the guideway path. It will be noted this guide tongue configuration enables insertion or removal of the fixtures relative to the guideway 11 through vertical displacement. When inserted into the guideway, the lower horizontal surface of the plate-form base 29 of each guide tongue 26 rest on the edge-surfaces 18 and 19 of the respective guide tracks 13 and 14 to provide the vertical support for the fixtures 10. Also, the body portions 31 of the guide tongues are of a length as is the depth of the guideway 11 to adequately resist laterally directed forces thereby providing a stable workpiece supporting platform.

In accordance with this invention, the stub axles 30 of the guide tongues 26 are relatively located to the respective tooth-form elements 34 and to each other in specifically predetermined relationship to avoid interference during traversal of the guideway 11. This problem of interference can be most clearly demonstrated by reference to FIGS. 4, 5 and 6 where the spatial relationships are best seen. The tooth-form elements 34 of the guide tongues 26, as well as the gear belt conveyor 12 in the straight run portions, may be considered as having a pitch line, with this pitch line becoming a pitch circle in the curved portions of the conveyor such as that portion extending around the pulley 20. The pitch line is designated by the letter P and in the case of a flexible endless belt such as the conveyor 12, is defined as being coincident with point of constant length with the pitch circle portion having a radius R. The axis of rotation (designated by the letter A) of the guide tongue 26 is the central axis of the stub axle 30 and is positioned on an axis transverse to the pitch line P and passing centrally through the groove 36 of the body portion 31 but the axis of rotation is laterally offset from the pitch line. It will be readily seen from FIG. 5 that the axis of rotation A of the two guide tongues 26 of the fixture 10 traversing the straight line portion at the lower left side of that figure must necessarily be spaced apart a distance that is an integral multiple of the pitch with the transverse axis of the two being parallel. The guide tongues 26 may also be defined as having a pitch line which is coincident with the pitch line of the gear-belt conveyor 12 along the straight run portions. The transverse axis extending through the axis of rotation A intersects the pitch line P at an assumed point of contact of the tooth form elements. It will also be noted that the spacing or distance between the pivot points A is a fixed, straight line distance D. The pitch line spacing or distance between the two tooth-form elements 12a of the conveyor 12 is also the same as the pivot point distance and this segment of the pitch line is designated by the letter L.

As the fixture moves into the curved segment of the guide-way 11, such as to the position shown in the upper portion of FIG. 5, the pitch line of each guide tongue 26 remains coincident or tangent to the pitch line or circle of the conveyor 12 at the point of assumed contact but a straight line extending between these assumed points of contact is now a chord C subtending a segmental arc S that is the segmental portion of the pitch circle. Consequently, with reference to FIG. 6 also, line D, which is of the same length as arc segment S, must form the chord of a segmental arc $S_1$ of a circle having a radius $R_1$, the radius $R_1$ being greater than the radius R of the pitch circle. Also, in this position, the transverse axis through axis of rotation A of the guides tongues 26 should be coincident with the radials passing through the respective assumed points of contact. Interference is thus avoided by laterally off-setting the axis of rotation of each tongue, relative to the pitch line, a distance equal to the difference between the radii R and $R_1$.

Figure 7:
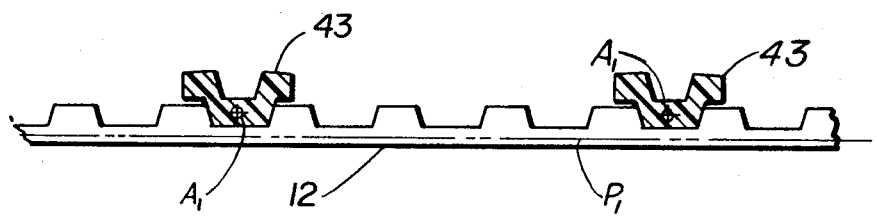
FIGS. 7, 8, 9 and 10 are transverse sectional views of four modified forms of guide tongues disposed in cooperative relationship to respective conveyors which guide tongues may be incorporated in work fixtures embodying this invention.
Figure 8:
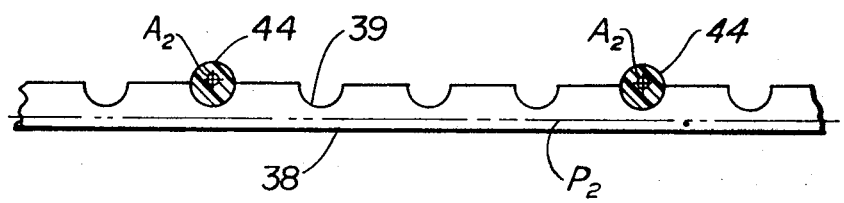
Figure 9:
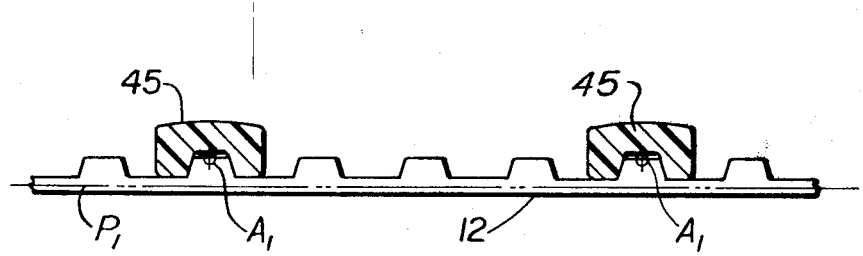
Figure 10:
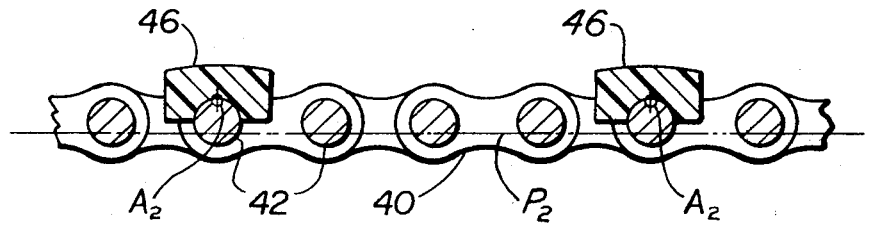

While a specific configuration of tooth-form elements has been specifically illustrated and described, it will be obvious that other configurations capable of effecting a positive engagement may be devised and constructed in accordance with this invention. Four such modified configurations of the guide tongue are shown in FIGS. 7-10. Each figure illustrates a portion of a conveyor in top plan view with FIGS. 7 and 9 having the same gear-belt conveyor 12 previously illustrated and described while the conveyor 38 of FIG. 8 comprises tooth-form elements 39 semicircular in cross-section and the conveyor 40 in FIG. 10 has cylindrical elements 42. In the latter case, the elements 42 are part of a link-type chain conveyor. The respective guide tongues are not shown in their entirety in each instance with only the associated main body portions 43, 44, 45 and 46 shown in cooperative engagement with the respective conveyor 12, 38 and 40. The configurations of FIGS. 7 and 9 are substantially the same as that previously described except that each comprises only one tooth-form element and the two are converse configurations. Each also has a pitch line $P_1$ extending through the belt as previously defined and the axis of rotation $A_1$ will also be laterally offset from this pitch line in accordance with this invention. The configurations shown in FIGS. 8 and 10 are also converse arrangements with the tooth-form of each being cylindrical. The pitch line $P_2$ in the case of the belt 38 of FIG. 8 is located as previously defined with respect to conveyor belt 12 and the respective axis of rotation $A_2$ of each guide tongue is laterally offset a distance from the pitch line as determined by this invention. The pitch line $P_2$ of the link-type chain conveyor 40 is similarly located with the axis of rotation $A_2$ of the guide tongues 46 laterally offset.

It will be readily apparent from the preceding detailed description of embodiments of this invention and accompanying drawings, that a novel work-supporting fixture is provided which is capable of supporting workpieces of relatively large dimension for transport by a conveyor system having a minimum structure. This fixture has a relatively large base dimension for greater stability as a consequence of the spaced relationship of the guide tongues relative to the base frame and to the pitch line of tooth-form elements.

Having thus described this invention, what is claimed is:

1. A work-supporting fixture for use in a conveyor system which includes a guideway having straight portions and curved portions of a particular radius of curvature and a flexible conveyor traversing the guideway provided with toothform elements at a predetermined pitch with the fixture comprising A. a base frame adapted to support a workpiece thereon for movement along a guideway as propelled by a conveyor, and B. A pair of elongated guide tongues which are each pivotally secured at one end to said base frame in spaced parallel relationship to each other for rotation about an axis extending longitudinally of each guide tongue, each guide tongue formed with a toothform element extending longitudinally thereof and adapted to cooperatively engage a conveyor's tooth-form elements, the axes of rotation of said guide tongues being longitudinally spaced a distance equal to an integral multiple of the pitch of the tooth-form elements with each axis of rotation being offset a distance laterally to a pitch line of the tooth-form elements whereby said guide tongues do not encounter interference during the fixtures traversal of straight and curved guideway portions of a conveyor system.

2. A fixture according to claim 1 in which the lateral offset distance is such that a straight line interconnecting the axes of rotation of said guide tongues forms a chord of an arc segment subtended by the same angle that subtends an arc segment of the same length as said chord but of lessor radius of curvature with the offset distance being the difference in radius of curvature of the two arc segments.

3. A fixture according to claim 2 in which each axis of rotation is laterally offset on an axis normal to the pitch line.

4. A fixture according to claim 1 wherein said toothform elements comprise gear teeth.

5. A fixture according to claim 1 wherein said toothform elements comprise cylindrical surfaces.

* * * * *